United States Patent
Lindermeir et al.

(10) Patent No.: US 6,561,449 B2
(45) Date of Patent: May 13, 2003

(54) PORTABLE TRANSPORTING DEVICE FOR WINDING MATERIAL

(75) Inventors: Wolfgang Lindermeir, Untermarchtal (DE); Vincent Reichart, Ulm (DE); Reiner Haufele, Laupheim (DE)

(73) Assignee: Gardena Kress + Kastner GmbH (DE)

( * ) Notice: Subject to any disclaimer, the term of this patent is extended or adjusted under 35 U.S.C. 154(b) by 0 days.

(21) Appl. No.: 09/911,758

(22) Filed: Jul. 23, 2001

(65) Prior Publication Data

US 2002/0027178 A1 Mar. 7, 2002

(30) Foreign Application Priority Data

Jul. 26, 2000 (DE) .......................................... 100 36 315

(51) Int. Cl.⁷ .............................................. B65H 75/40
(52) U.S. Cl. ................................ 242/391.2; 242/397.5; 242/403.1; 137/355.27
(58) Field of Search ............................. 242/391, 391.1, 242/391.2, 391.3, 397.5, 403.1, 394, 394.1; 137/355.12, 355.16, 355.26, 355.27

(56) References Cited

U.S. PATENT DOCUMENTS

| | | | | |
|---|---|---|---|---|
| 286,046 A | * | 10/1883 | McGaffey | 242/391.1 |
| 308,411 A | * | 11/1884 | Harding et al. | 242/391 |
| 332,589 A | * | 12/1885 | Cope | 242/391.2 |
| 594,969 A | * | 12/1897 | Schmitt | 242/391.3 |
| 695,241 A | * | 3/1902 | Shaver | 242/391.3 |
| 975,245 A | * | 11/1910 | Hughes | 242/391 |
| 1,152,273 A | * | 8/1915 | Boland | 242/391.3 |
| 1,188,277 A | * | 6/1916 | Jones | 242/391.2 |
| 1,418,575 A | * | 6/1922 | Iverson et al. | 242/391.3 |
| 1,491,305 A | * | 4/1924 | Hop et al. | 242/391.3 |
| 1,761,191 A | * | 6/1930 | Browning | 137/355.12 |
| 1,812,065 A | * | 6/1931 | Svade | 242/391.2 |
| 1,918,768 A | | 7/1933 | Markkula | |
| 2,016,625 A | * | 10/1935 | Carrier | 242/391.2 |
| 2,284,726 A | * | 6/1942 | Coulter | 242/391.2 |
| 3,078,059 A | * | 2/1963 | Johnson et al. | 242/397.5 |
| 3,642,224 A | * | 2/1972 | Taylor | 242/391.2 |
| 5,957,400 A | * | 9/1999 | Brannen | 242/391 |

FOREIGN PATENT DOCUMENTS

| | | |
|---|---|---|
| DE | 2798910 A | 10/1913 |
| DE | 1 063 672 A | 8/1959 |
| DE | 11 00 548 | 8/1961 |
| DE | 12 66 602 | 4/1968 |
| DE | 21 12 294 | 9/1972 |
| DE | 43 04 127 | 8/1994 |
| FR | 13 26 348 | 4/1963 |

* cited by examiner

Primary Examiner—John M. Jillions
(74) Attorney, Agent, or Firm—Akerman Senterfitt

(57) ABSTRACT

A portable or travelling transporting device for winding material usable as a hose truck has a frame (3), to which are fitted a travelling mechanism (4) with ground wheels (6) for moving on a ground surface, as well as a hose winding drum. The ground wheels (6) rotating on moving the hose truck can be brought into driving connection with the winding drum by means of a force transfer means (25) constructed as a flat gear. A slip clutch (46) located in the force transfer path ensures that during the advance of the hose truck a laid out hose can be wound onto the winding drum with a limited winding force appropriate for troublefree, compact winding on.

34 Claims, 4 Drawing Sheets

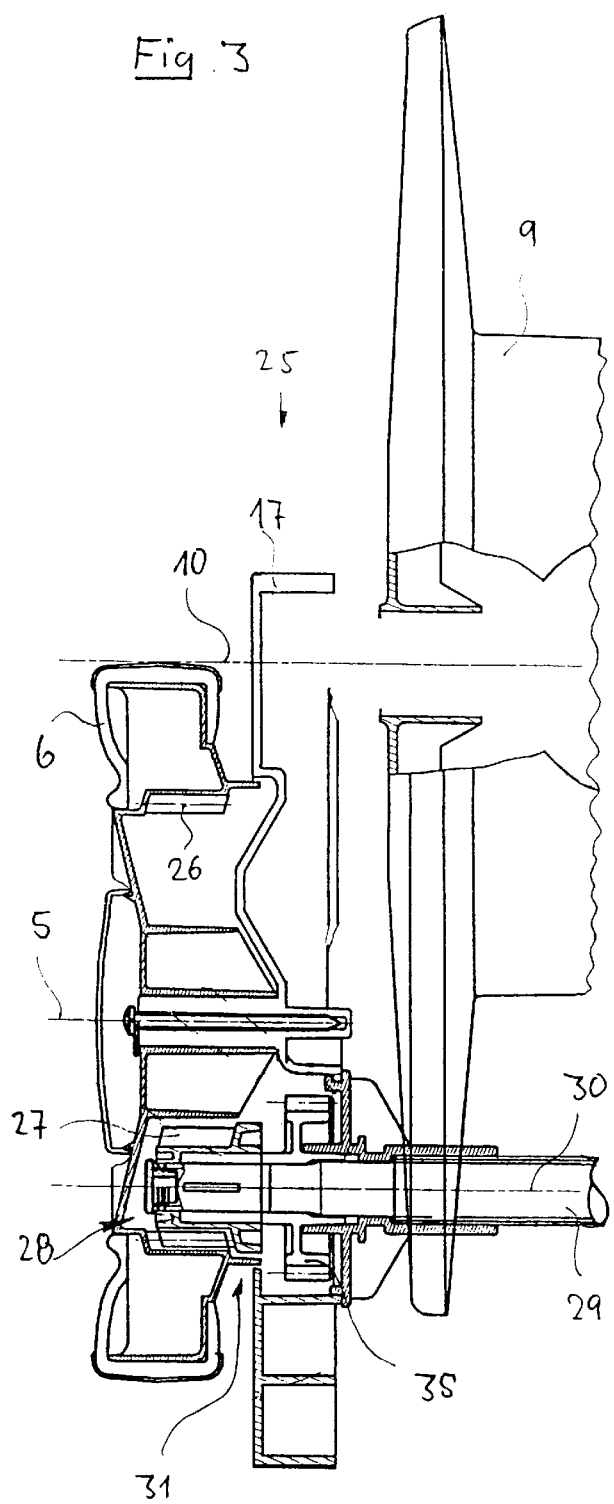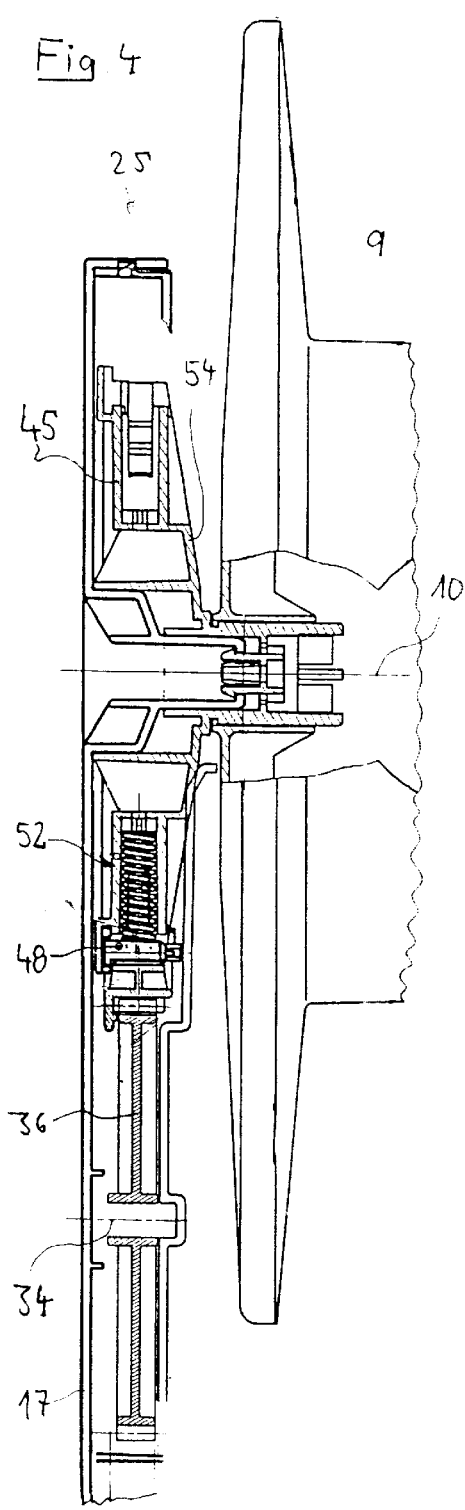

PORTABLE TRANSPORTING DEVICE FOR WINDING MATERIAL

Figure 1:
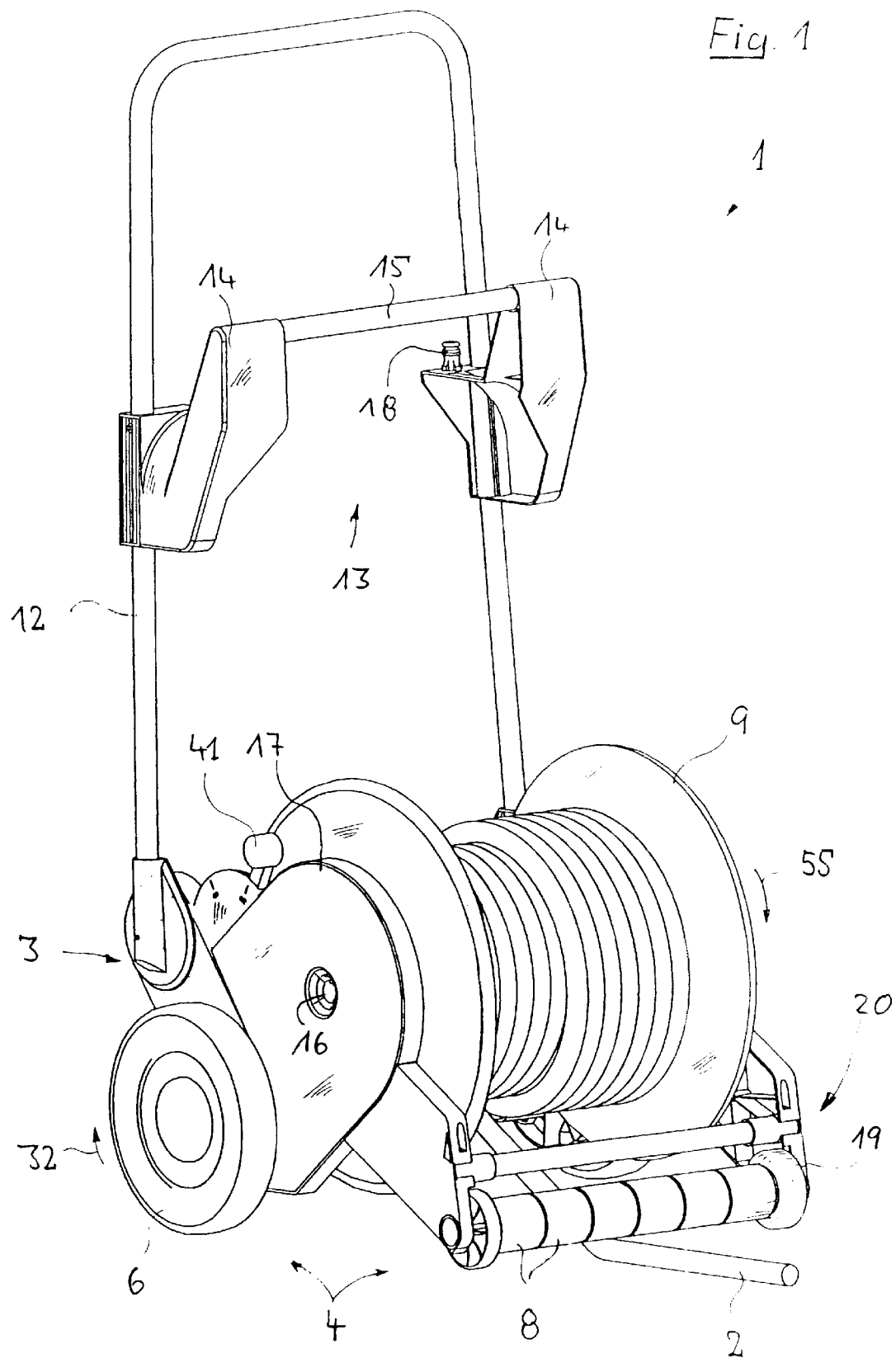

The invention relates to a portable or traveling transporting device for winding material, particularly a hose truck.

Transporting devices of this type are e.g. used in the garden sector as portable or travelling hose trucks. They have a frame normally provided with a handle or the like and on which is provided a travelling mechanism for moving the transporting device on a ground surface and at least one winding drum for winding up the winding material, e.g. a hose or cable. The travelling mechanism, which normally has several ground wheels or rolls, comprises at least one rotary element rotatable by the movement of the transporting device, i.e. driven by the advance or return movement of said transporting device and a force transfer mechanism for making a drive connection between said rotary element and the winding drum. Such a force transfer means, e.g. constructed as a gear, makes it possible to couple the advance or return movement of the transporting device with the winding movement of the winding drum, so that e.g. during the movement of the transporting device a hose is automatically wound on or off by the winding roll driven in rotary manner.

A hose truck in which a hose drum is drivable by means of a gear through the rotation of ground wheels is known from DE 43 04 127. In the case of this hose truck the diameters of the ground wheels connected to the gear, the gear ratio and the winding drum diameter are so matched to one another that when the winding drum is empty the travel distance covered substantially corresponds to the winding up length brought about by the rotation of the winding roll. As a result an exact single-layer rolling up of the hose is made possible and simultaneously a horizontally moving hose guide is driven, which ensures that the hose during each drum rotation is precisely and adequately placed on the previously wound portion. A multilayer winding does not take place.

The problem of the invention is to create a portable winding material transporting device of the aforementioned type in such a way as to permit a problemfree winding up and off of even considerable winding material lengths.

A transporting device of the aforementioned type constructed according to the invention and in particular in the form of a hose truck is so constructed that in the case of a single or multiple layer winding up of winding material a limited winding force can be exerted thereon. The winding force is automatically set in such a way that there are no excessive tensile forces stretching or straining the hose or other winding material over a considerable distance. As a result the winding material is protected during the winding process and at the same time a tight and consequently compact or space-saving winding is possible. The limited winding force is made available substantially independently of the winding diameter, so that it is provided both with a single-layer winding and also when there are several winding layers. Thus, large winding material lengths can be housed on a winding drum of limited width. The magnitude of the limited winding force is appropriately dimensioned in such a way that on the one hand the formation of loose winding loops is avoided and on the other the possibly hollow winding material is not compressed or excessively loaded in any other way.

For this purpose, according to a preferred further development the force transfer means between the rotary element and the winding drum has at least one automatic torque limiting device for limiting the torque transferred by the rotary element to the winding drum. Thus, without any external intervention on the part of an operator, there can automatically be a loosening or interruption of the drive coupling between the travelling mechanism and the winding drum as soon as the movement of the transporting device provides more torque than is needed for maintaining the limited winding force. In particular, within the force transfer path from the travelling mechanism to the winding drum can be provided a type of slip clutch, which can e.g. ensure that in the presence of larger hose layer diameters and/or with a multilayer winding the travelling mechanism or drive side can lead compared with the winding drum rotation, but without the force transfer being completely eliminated.

The torque limiting means can have any appropriate construction ensuring said slip clutch function. According to a further development, which is in particular characterized by simple construction, robustness and reliable operation, the torque limiting means has a coupling part in the form of a coupling gear wheel and another rotary coupling part with at least one spring-loaded driving element, which is constructed for engagement in the teeth of the coupling gear wheel. Thus, below a torque limit, a positive driving of both coupling parts is brought about, whereas on exceeding the torque limit the driving element, counter to the spring tension, leaves the positive engagement position, so as to permit a mutual relative rotation of the coupling parts. Appropriately the driving element is constructed as a roll or rolling body, e.g. in the manner of a roller, so that a low-wear coupling operation is aided. Preferably there are several driving elements uniformly distributed along the coupling gear wheel circumference in order to on the one hand ensure a reliable engagement and on the other to assist an automatic centring of the coupling gear wheel, which can also be independently placed in a guide.

In the case of several, e.g. four driving elements, the tooth system of the coupling gear wheel can have a plurality of teeth which cannot be divided by the number of driving elements. As a result always only part of the driving elements are in complete engagement with the tooth system and the notch step width on notching through the winding drum is reduced by a factor of e.g. two compared with the circumferential spacing of neighbouring teeth, so that even with coarse teeth a fine notching can be achieved.

In an embodiment explained in greater detail in conjunction with the drawings, the tooth system of the coupling gear wheel is asymmetrical with respect to a rotation direction reversal and preferably the teeth of the tooth system have a steep side and a side which is less steep. As will be explained hereinafter, as a result e.g. with a faster relative rotation of the coupling parts it is possible to avoid a jumping of the driving elements and a resulting reduction of the driving force and additionally an easier manual rotation of the winding drum in the winding up direction can take place with reduced force expenditure.

As a result of the force transfer means in the case of a transporting device constructed as a hose truck it is possible to bring about an automatic winding up of the hose in the travel direction of the hose truck towards a laid out hose portion. According to a further development the force or torque-transferring coupling between the travelling mechanism and the winding drum can, if necessary, be eliminated. For this purpose the force transfer means has a preferably manually operable clutch for the as desired cancellation or making of the drive connection between the rotary element and the winding drum and which can e.g. be operated by means of a clutch lever. The possibility of cancelling out the drive connection is e.g. advantageous if the hose or other winding material is to be unwound manually from the winding drum with the transporting device stationary or if the transporting device is to be moved solely for transportation without winding drum rotation.

Apart from numerous possibilities known to the expert for implementing such a clutch, preference is given to a variant in which the clutch has at least one coupling gear wheel positioned between a drive or travelling mechanism-side gear wheel and a drive side gear wheel, which as a result of the displacement of its rotation axis can, as desired, be engaged or disengaged with respect to at least one of the adjacent gear wheels. Such clutches are particularly advantageously implementable in a flat gear. If the rotation axis of the coupling gear wheel is pivotable about the rotation axis of its neighbouring gear wheels, the coupling gear wheel remains engaged with said gear wheel even in the uncoupled state, so that a following coupling can be performed in a particularly reliable manner.

It is also possible for the coupling permitted by the force transfer means between the travelling mechanism and the winding roll to act in both movement directions of the transporting device, so that the winding drum can be driven both in the winding up and the unwinding direction. However, preferably, the force transfer means is constructed for a drive connection between the rotary element and the winding drum only acting in the winding up direction of said drum. In a further development this is implemented in that the force transfer means has between the rotary element of the travelling mechanism and the winding drum at least one freewheel device, particularly in the manner of a ratchet freewheel. Thus, even in the absence of a disengageable clutch, an easy manual unwinding of winding material would be possible even with the transporting device stationary.

In preferred further developments the winding characteristics of the transporting device are significantly aided by a pressing device connected upstream of the winding drum in the movement direction on winding up for pressing winding material located on the ground surface onto the latter. As a result of the thus permitted easy pressing of e.g. a hose to be wound up on a lawn surface a slipping of the hose on the ground is largely avoided, so that e.g. a hose laid out in curves is not drawn tight whilst shortening said curves. This makes it possible to obtain an easy, continuous winding up without rotation speed jumps on the part of the winding roll. Through the obviating of the tension on the hose, it is also possible to avoid a force action on a tap or faucet connecting piece or a control device located at the hose connection, such as e.g. an automatic watering control device, so that there is no damage or destruction to such parts, which can easily take place when a tensile force acts via the hose. Appropriately the pressing device extends essentially over the entire width of the transporting device, so as to ensure an adequate pressing of the winding material, particularly in curves. Although the pressing can be brought about by runners, brushes, etc., the pressing device preferably has as the pressing member at least one roll body for rolling on the laid out winding material, so as to permit an easy relative movement between the pressing device and the winding material. the compressive force acting in the ground surface direction necessary for a pressing action is preferably at least partly provided by the transporting device, so that for this purpose no force need be expended by an operator. Thus, e.g. the pressing device can be so positioned relative to the winding drum that at least part of the winding drum weight acts on the pressing device. An embodiment in which the pressing device is formed by the front rolls of a travelling mechanism will be described relative to the embodiments.

An upstream connected pressing device of the aforementioned type can be advantageous, independently of the slip clutch function shown, in other hose trucks or similar transporting devices not in accordance with the invention. A pressing roll or a similar pressing member can also be appropriate in the case of conventional hose trucks with moving unwinding of the hose from the hose drum, because as a result e.g. the aforementioned disadvantages are avoidable, namely the stretching of a hose laid out in curves and/or a disadvantageous force action on a tap or faucet connection.

These and further features can be gathered from the claims, description and drawings and the individual features, either singly or in the form of subcombinations, can be implemented in an embodiment of the invention and in other fields and can represent advantageous constructions.

An embodiment of the invention is described hereinafter relative to the attached drawings, wherein show:

FIG. 1 An inclined perspective front view of a preferred embodiment of a hose truck according to the invention.

Figure 2:
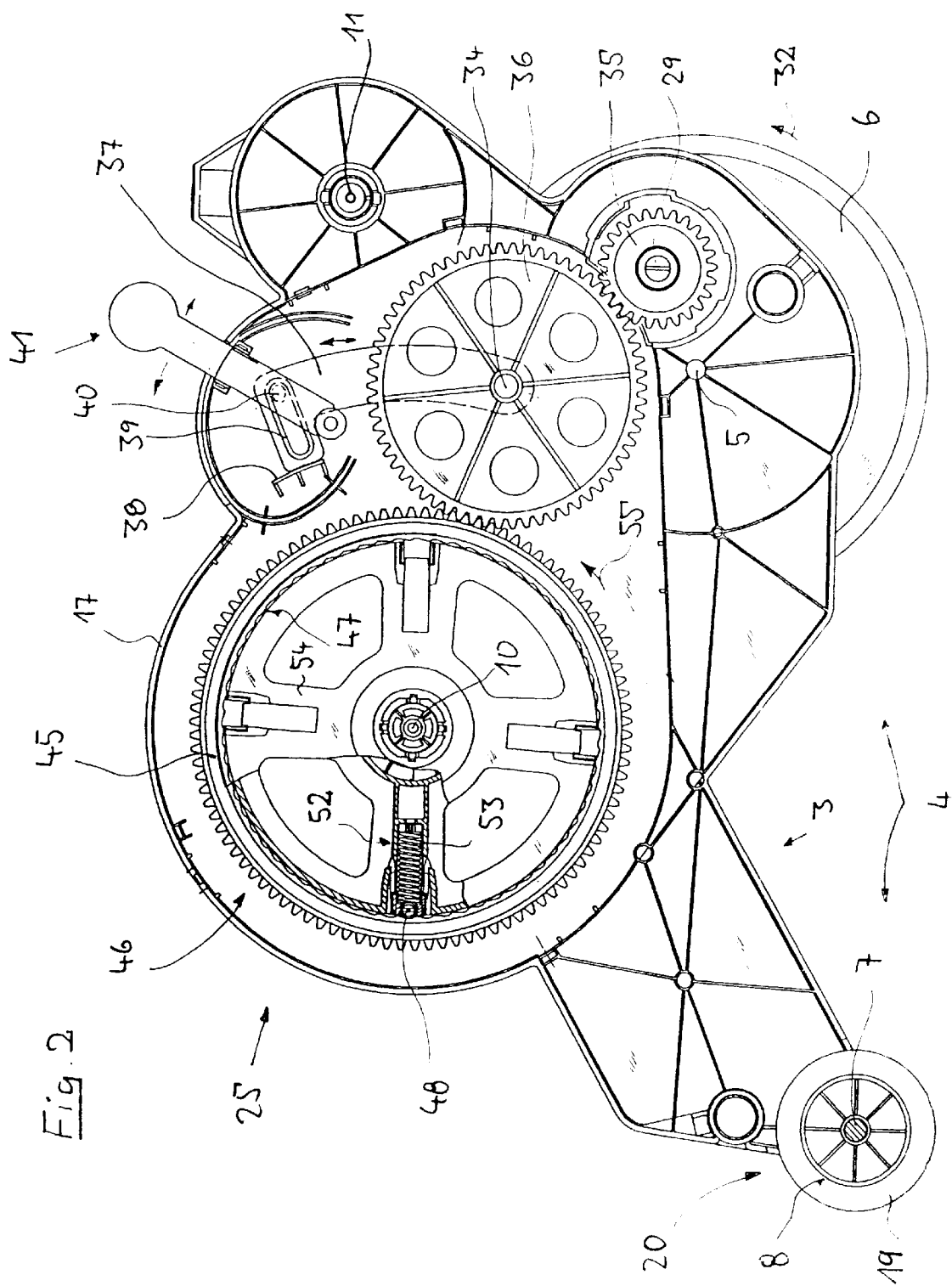

FIG. 2 A side view with significant elements of a force transfer means for making a drive connection between the ground wheels and the winding drum of the hose truck shown in FIG. 1, viewed from the inside of a housing receiving the gear elements.

FIG. 3 A diagrammatic, part sectional plan view of part of the force transfer means with a freewheel device located between a ground wheel and a driving shaft.

FIG. 4 A diagrammatic, part sectional plan view of part of the force transfer means with a coupling gear wheel in engagement with a slip clutch gear wheel.

Figure 5:
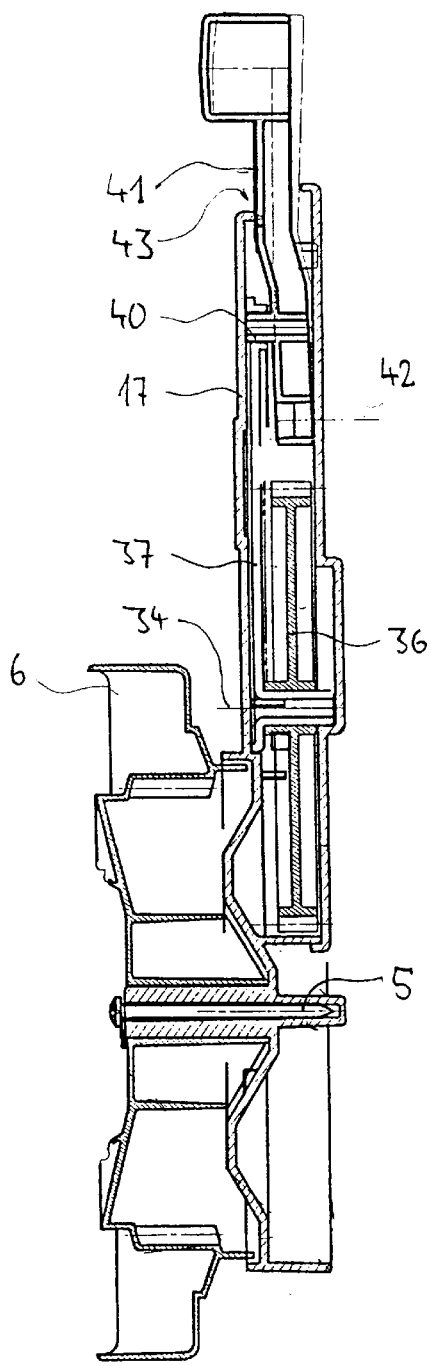

FIG. 5 A diagrammatic, part sectional plan view of part of the force transfer means with a coupling gear wheel, whose rotation axis can be displaced by actuating a clutch lever.

Figure 6:
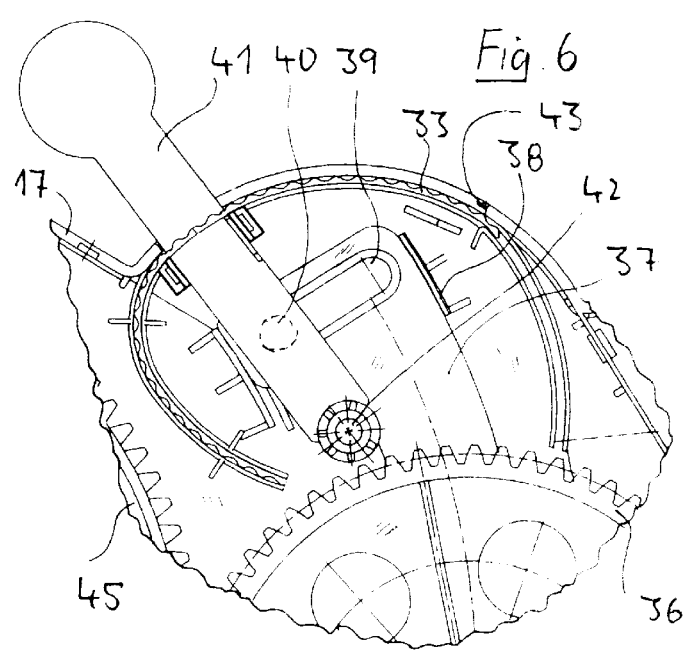

FIG. 6 A lateral detail view of the area of the clutch lever with the movable housing protective cover.

Figure 7:
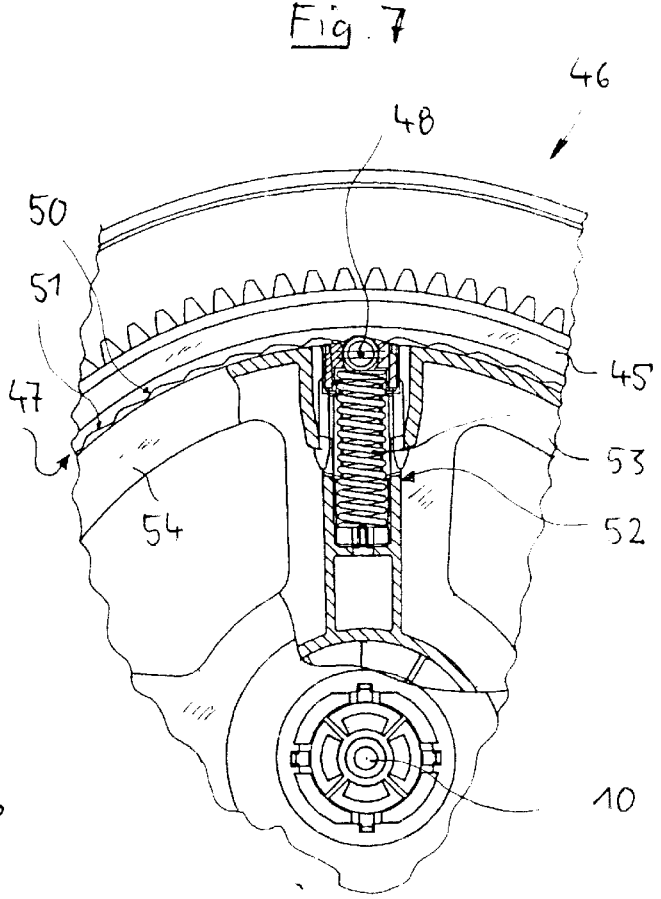

FIG. 7 A larger scale partial view of FIG. 2 to explain the construction of the torque limiting means.

The inclined perspective front view of FIG. 1 shows a preferred embodiment of a portable or travelling hose truck 1 with the aid of which winding material in the form of a flexible garden hose 2 can be transported and wound up or unwound. The hose truck has a frame 3, which is essentially made from flexurally stiff, injection moulded plastic parts and which can be moved with the aid of a travelling mechanism 4 fitted to its underside on a ground surface, e.g. a piece of lawn. The travelling mechanism 4 comprises two rear ground wheels 6 mounted so as to rotate about a wheel axle 5 on the frame 3 and at the front end of the frame smaller diameter front rolls 8 engaged on a horizontal, cylindrical rod 7. Above the travelling mechanism a hose winding drum 9 is mounted so as to rotate about a horizontal drum axis 10 on the frame 3. The centre of gravity of the hose drum 9, which in particular forms the main weight contribution of the hose truck particularly when the hose is partly or completely wound up, is located in the travel direction between the ground wheels and the front rolls, so that the hose drum weight has a significant loading effect on the front rolls 8.

For the handling of the hose truck use is made of a substantially U-shaped handle 12 pivotable at the rear end of the frame about a horizontal handle spindle 11. Said handle can be freely pivoted from the vertical or upright position shown both forwards, i.e. in the hose drum direction, and rearwards between end positions defined by stops. On the vertical legs of the handle Is fixed a vertically adjustable hose holding device 13, which comprises two hose supports 14 screwed to the vertical legs of the handle and which are connected by means of a horizontal bar 15 usable as an additional handle bar.

Onto the substantially cylindrical inner part of the winding drum 9 can be wound a considerable length of e.g. 10 to 30 m of a garden hose or the like in the form of several layers. The drum-side end of the long hose portion is connected to a not shown hose nipple located in the centre of the winding roll and which communicates through the interior of the winding drum with an outlet connection 16, which is positioned centrally to the drum axis 10 on the side wall 17 of frame 3 visible in FIG. 1. To said outlet connection can be connected a shorter working hose portion e.g. having a length of 3 to 6 m, to whose end can be connected a water-carrying working implement, e.g. a spraying nozzle, sprinkler, brush, etc. The working hose can be partly or completely loosely wound onto the hose holding device 13. A working implement can also be engaged on a connecting piece 18 of the hose holding means shaped like a hose connecting nipple, so as to be easily accessible at all times.

Starting from the indicated, upright rest position, the handle 12 can be pivoted forwards about its fulcrum by a limited angle of e.g. 5 to 10° and as a result of its own weight or additionally through an appliance possibly suspended on the handle can be kept in the stable position. In this position there can also be a notching system. The handle can also be pivoted rearwards into an inclined position by an angle of e.g. 60 to 70° without the front rolls rising, so that for operators of different size it is possible to obtain a comfortable movement position during the advance of the hose truck. In the case of a more pronounced inclination the handle strikes against stops provided in the vicinity of the swivel hinges, so that on further lowering the front rolls are pivoted about the ground wheel axis 5 and can be raised upwards in order to e.g. facilitate the overcoming of obstacles.

The ground wheels, which rotate during the manual advance or return of the hose truck, serve as the drivable rotary elements of said truck and are arranged in the form of wheel pairs to the left and right sides of the hose drum 9. However, the front rolls form a substantially closed, cylindrical rolling surface over the entire width of the hose truck. Alternatively to the several individual rolls shown, there can be a single continuous roller. The hose 2 passes beneath the front rolls between the portion wound onto the winding drum and the portion laid out on the ground. In the case of the front rolls, the outer, marginal rolls in each case have a radially projecting bead 19, whose radial height over the otherwise cylindrical rolling surface of the front rolls can be slightly smaller than the diameter of the hose 2. With the aid of the front rolls is created a pressing device 20 ensuring that the unwound hose is pressed onto the ground in the immediate vicinity of the hose drum. This can largely prevent a slipping of the hose on the ground, so that e.g. a hose laid out in curve form on winding up is not tightly drawn so as to shorten the laid out curves, The hose truck permits an automatic rolling up of a laid out hose, if the truck is moved in the direction of the laid out hose portion, i.e. forwardly in the front roll direction. The force transfer between the ground wheel movement and the hose drum movement provided for this purpose is brought about by a force transfer means 25, which will be explained in greater detail hereinafter relative to FIGS. 2 to 7. For each of the ground wheels 6 mounted in rotary manner on an associated side wall of the frame 3 on the inner circumference of the wheel body is provided an internal tooth system 26 in which engages an external tooth system 27 of a pinion 28, which is located on the outer end of a driving shaft 29 projecting outwards through the frame outer wall and which is mounted in rotary manner in bearing means about a shaft axis 30 in each case located in the frame side walls 17. The pinion 28 is connected to the driving shaft 29 by means of a freewheel device 31 or forms with the driving shaft 29 a freewheel device. The latter is constructed in such a way that the pinion 28 is rotatable relative to the driving shaft 29, which is only driven in one rotation direction, namely in the advance direction 32 on rotating the ground wheels. The freewheel device operating in the manner of a ratchet freewheel and which in the driving direction creates a slip-proof positive connection between the drive side formed by the ground wheel and the driving shaft can be constructed in the manner of the freewheel device of DE 198 37 049, whose features are by reference made into part of the content of the present description. As preferably on each side of the driving shaft 29 there is such a force introduction by means of a freewheel, an adequate drive is ensured even when there is ground adhesion on the part of only one ground wheel and/or when taking curves.

The further gear elements of the force transfer means are preferably provided on only one side of the hose truck and form a flat gear, whose rotary gear elements are essentially located in one plane. The largely dirt-protected gear elements housed within the side wall 17 are shown completely in FIG. 2 and in partial views in FIGS. 3 to 7. The further gear elements comprise an intermediate gear wheel 35 connected in non-rotary manner to the driving shaft 29 and whose external tooth system with the gear engaged (FIG. 2) is in engagement with the external tooth system of a coplanar coupling gear wheel 36, which is rotatably mounted about an axis 34 on a slider element 37.

The flat, arcuately curved slider element 37 is displaceably guided in the arcuate direction between guide strips 38 of the frame 2 and has on its upper end an oblong hole-shaped recess 39 running transversely to the arcuate direction and in which engages a pin 40, located eccentrically to the lever pivoting axis 42 on a pivoting lever 41. The free end of the pivoting lever 41 provided with a retaining button projects through a guide slot 43 over and beyond the housing top. To protect the interior of the substantially closed housing sealing the flat gear elements against dirtying from above, the guide slot 43 is covered with a flexible, window blind-like protective cover 33 (FIG. 6). The protective cover is fixed to the lever 41, essentially comprises parallel plastic strips, which are flexibly connected by means of film hinges and is displaceably guided between parallel, continuously varying curvature guide strips of the housing outer wall. By pivoting the lever 41 between the front position shown in FIGS. 1 or 6 and the rear position shown in FIG. 2, whilst displacing the slider 37 in its guides, the rotation axis 34 of the coupling gear wheel 36 can be displaced along an arc running round the drum axis 10 in such a way that the coupling gear wheel 36 in the rear lever position engages with the intermediate gear wheel 35, whereas in the front uncoupling position it is uncoupled from the intermediate gear wheel.

Independently of the position of the pivoting lever 41, the coupling gear wheel 36 is in engagement with a driving ring 45, which is mounted on the frame 2 in rotary manner coaxially to the hose drum axis 10. The driving ring 45 is part of a torque limiting means 46 provided in the force transfer line between the ground wheels and the hose drum and constructed in the manner of a slip clutch, which is constructed in such a way that a rotating driving ring 45 drives the hose drum 9 with the torque limiting means or can be driven by it. The torque limiting means on the one hand ensures that e.g. a loose hose can be reliably wound and on the other that tensile forces acting on the hose are limited, so as to e.g. avoid a tightening of a laid out hose portion on winding up.

In the embodiment shown the slip clutch is implemented in such a way that the driving ring or slip clutch ring 45 carries an external tooth system, which is always in engagement with the teeth of the coupling gear wheel 36, so that when the clutch is engaged the driving ring 45 is always rotated in a fixed relationship to the ground wheel rotation. The driving ring has a radially inwardly directed helical tooth structure 47, which can be more particularly gathered from FIG. 7, in which radially engages at least one driving element 48 spring-loaded by means of a radially oriented helical compression spring 53. The internal tooth system 47 of the driving ring 45 is constructed as flat teeth not symmetrical with respect to a rotation direction reversal, in which the identical tooth segments 49 in each case have a steep side 50 and a shallow side 51. The spring-loaded driving element 48, which is in roller form in the embodiment shown, is pressed in the direction of the tooth gullet by a helical compression spring 53 guided in a radially directed spring bushing 52. The spring bushing 52 is constructed in a rotary part 54 rotatable about the axis 10 and which is connected in non-rotary manner to the hose drum 9. Although a single such driving element can be adequate, preferably there are at least two such driving elements in radially opposed manner. The represented embodiment has four driving positions circumferentially displaced by in each case 90° and the driving elements are located with identical tooth side positions in pairwise facing manner, but with respect to which the drive pair arranged in crossed orientation are circumferentially displaced by half a tooth segment. The notch step width on notching through the hose drum is consequently halved. This fine notching is achieved in that the number of tooth segments 49 of the internal tooth system of the slip clutch ring 45 is dividable by two and not by four. Moreover, the pairwise identical positioning of the facing driving elements with respect to the individual tooth segments brings about a distribution of the driving force on in each case two elements and an automatic centring of the slip clutch ring 45, which is also independently inserted in a guide.

As a result of the shape of the tooth segments 49, which is not symmetrical with respect to a rotation direction reversal, it is firstly ensured that in each case one drive pair is reliably pressed into the associated tooth angle and in particular engages on the steep side 50. In addition, the non-symmetrical tooth shape ensures that even in the case of rapid relative rotation of the slip clutch ring with respect to the hose drum in the winding direction 55, the in each case moving up drive elements through the shallow side always remain in contact therewith, so as to avoid a jumping of the drive elements and the resulting reduction of the driving force. The unequal sides also permit a simple manual rotation of the drum in the winding up direction and in such a case the driving elements roll with limited force resistance on the shallow sides and consequently the drum can be manually rotated with limited force expenditure. On winding off the hose and the remaining engagement of the coupling wheel there is a compensation between the winding off length of the hose which is greater than the travel path using the slip clutch function.

The torque limitation means also ensures that in the case of a single or multiple layer winding, i.e. independently of the winding diameter, a limited winding force is always exerted on the hose, so as to bring about a troublefree, compact, fixed winding. For this purpose the diameter of the ground wheel 6 is appropriately approximately the winding diameter of the empty hose drum 9. With one or more already present winding layers of the hose 2 on the winding drum there is an increase in the effective winding diameter and therefore the winding length per drum rotation. The overall gear 25 is dimensioned in such a way that with completely unwound hose, i.e. with the hose drum empty and therefore a minimum effective winding diameter, the winding length per ground wheel rotation is roughly equal to or slightly smaller than the travel path of the ground wheel rotation. With a larger active winding diameter if e.g. a second or third layer is wound on, the winding length per ground wheel rotation exceeds the corresponding travel path, so that the drum rotation advances compared with the ground wheel rotation and as a result the laid out drum would be tightened. As a result of the torque limitation between the ring 45 positioned coaxially to the drum 9 and the actual drum, the tightening of the hose remains relatively small and is also limited to the portion between the drum and front rolls 8 and is not transferred to the laid out hose portion in front of the front rolls.

In the embodiment shown the coupling of the drum rotation with the ground wheel rotation can be cancelled out by the displacement of a gear element, namely the coupling gear wheel 36. Thus, as stated, the axis 34 of the coupling wheel 36 is pivotable about the hose drum axis 10 on an arcuate portion. The teeth of the coupling gear wheel 36 always remain in engagement with the teeth of the slip clutch ring 45, but can be disengaged from the intermediate gear wheel 45. On operating the clutch lever 41, which is disengageable by lateral pressure from the outside (dot-dash lines in FIG. 5) from its end position-fixing bulges in the guide slot 43, the driving pin 40 sliding in the link 39 presses the slider in one or other direction and thereby engages or disengages the coupling wheel 36 with respect to the intermediate gear wheel 35. As an alternative it would be possible to displace the coupling gear wheel 36 parallel to its rotation axis 34. The possibility of uncoupling is particularly favourable for the unwinding of the hose from the drum and/or for manual drum operation. Manual drum operation can take place by gripping the drum edge.

The represented embodiment of a hose truck according to the invention permits a particularly rational operation during the handling of larger hose lengths, in order to e.g. sprinkle or water lawn parts which are far removed. In the case of conventional hose trucks this normally takes place in such a way that a hose truck is set up in the vicinity of a water connection, a short hose portion leading to the hose drum axis is connected to the water connection and the hose portion wound onto the hose drum is removed by the operator slowly moving away from the truck. Winding up generally takes place by manually turning back the winding roll. However, the hose truck shown here can be used in the manner of a hose caddie. Firstly the end of the wound up hose portion 2 is connected to a water connection and the working hose possibly provided at its end with a working implement is wound onto the hose holding means 13 on the handle. The hose truck is then pulled to the place of use and the hose 2 is slowly unwound from the hose roll 9. On completion of work it is possible to move the hose truck forwards along the laid out hose portion towards the water connection and as a result of the described automatic winding mechanism there is a reliable independent winding of the hose onto the hose drum 9 without any action being necessary thereon on the part of the operator. Through the possibility of eliminating the drive connection between the ground wheels and the hose drum with the aid of the clutch lever, the hose truck can at all times be used in the conventional manner.

What is claimed is:

1. A portable transporting device for winding material, particularly a hose truck, having:
    a frame on which a traveling mechanism is provided for moving the transporting device on a ground surface and at least one winding drum for winding up winding material, such as a hose,
    wherein the traveling mechanism has at least one rotary element rotatable by the movement of the transporting device and a force transfer means for making a drive connection between the rotary element and winding drum, and
    wherein a pressing device is connected upstream of the winding drum in the winding up movement direction for pressing the winding material located on the ground surface onto the ground surface.

2. Transporting device according to claim 1, wherein the transporting device is constructed in such a way that in the case of single or multiple layer winding up of winding material, the winding material can be wound with a limited winding force.

3. Transporting device according to claim 1, wherein on winding up the winding material, a winding force acting on the winding material can be limited at least one of automatically and substantially independently of an effective winding diameter.

4. Transporting device according to claim 1, wherein the force transfer means between the rotary element and the winding drum has at least one automatic torque limiting means for limiting the torque transferred from the rotary element to the winding drum.

5. Transporting device according to claim 4, wherein the torque limiting means has a coupling part in the form of a gear wheel with a tooth system and another coupling part with at least one spring-loaded driving element, which is constructed for engaging in the tooth system of the gear wheel.

6. Transporting device according to claim 5, further comprising several driving elements uniformly arranged along the circumference of the gear wheel.

7. Transporting device according to claim 5, wherein several driving elements are provided and wherein the tooth system of the gear wheel has a number of teeth not dividable by the number of driving elements.

8. Transporting device according to claim 5, wherein the tooth system is asymmetrical with respect to a rotation directional reversal.

9. Transporting device according to claim 1, wherein the force transfer means has a manually operable clutch for the as desired canceling out or making of the drive connection between the rotary element and the winding drum.

10. Transporting device according to claim 1, wherein the force transfer means has a coupling gear wheel between a drive-side gear wheel coupled to the rotary element and a driven side gear wheel coupled to the winding drum and which can, as desired, be engaged or disengaged with respect to at least one of the adjacent gear wheels.

11. Transporting device according to claim 1, wherein the force transfer means is constructed for a drive connection between the rotary element and a ground surface drum that is only active in the winding up direction of the drum.

12. Transporting device according to claim 1, wherein the pressing device has a roll body for rolling on the laid out winding material.

13. Transporting device according to claim 1, wherein the pressing device is positioned with respect to the winding drum in such a way that at least part of the weight of the drum possibly carrying the winding material acts on the pressing device.

14. Transporting device according to claim 1, wherein a gripping device is provided on the frame for the handling of the transporting device, wherein the gripping device is movable with respect to the frame and Is pivotable about a horizontal pivoting axis.

15. Transporting device according to claim 14, wherein the gripping device, with respect to a vertical position, can be pivoted forwards towards the winding drum and rearwards.

16. Transporting device according to claim 14, wherein in addition to the winding drum, it has at least one further hose holding device preferably located on a gripping device.

17. Transporting device according to claim 4, wherein the torque limiting means is a slip clutch.

18. Transporting device according to claim 5, wherein the driving element is a roller.

19. Transporting device according to claim 6, wherein four driving elements are provided.

20. Transporting device according to claim 7, wherein four driving elements are provided, and wherein the number of teeth of he tooth system is evenly dividable by two, but not by four.

21. Transporting device according to claim 8, wherein the tooth of the tooth system have a steep side and a shallow side.

22. Transporting device according to claim 10, wherein the engagement and disengagement of the coupling gear wheel is achieved by the displacement of its rotation axis, the rotation axis being pivotable about the rotation axis of one of the adjacent gear wheels.

23. Transporting device according to claim 11, wherein the force transfer means has at least one freewheel device between the rotary element and winding drum.

24. Transporting device according to claim 23, wherein the freewheel device is a ratchet freewheel.

25. Transporting device according to claim 1, wherein the pressing device extends over the entire width of the transporting device.

26. Transporting device according to claim 1, wherein the gripping device comprises a substantially U-shaped handle.

27. A portable transporting device for winding material, particularly a hose truck, having:
    a frame on which a traveling mechanism is provided for moving the transporting device on a ground surface and at least one winding drum for winding up winding material, such as a hose;
    wherein the traveling mechanism has at least one rotary element rotatable by the movement of the transporting device and a force transfer means for making a drive connection between the rotary element and winding drum,
    wherein the transporting device is constructed In such a way that in the case of single or multiple layer winding up of winding material, the winding material can be wound with a limited winding force, and
    wherein the force transfer means has at least one torque limiting means for limiting the torque transferred from the rotary element to the winding drum, the torque limiting means having a coupling part in the form of a gear wheel with a tooth system and another coupling part with at least one spring-loaded driving element, which is constructed for engaging in the tooth system of the gear wheel.

28. Transporting device according to claim 27, wherein the driving element is a roller.

29. Transporting device according to claim 27, further comprising several driving elements uniformly arranged along the circumference of the gear wheel.

30. Transporting device according to claim 29, wherein four driving elements are provided.

31. Transporting device according to claim 27, wherein several driving elements are provided and wherein the tooth system of the gear wheel has a number of teeth not dividable by the number of driving elements.

32. Transporting device according to claim 31, wherein four driving elements are provided, and wherein the number of teeth of the tooth system is evenly dividable by two, but not by four.

33. Transporting device according to claim 27, wherein the tooth system is asymmetrical with respect to a rotation directional reversal.

34. Transporting device according to claim 33, wherein the teeth of the tooth system have a steep side and a shallow side.

* * * * *